United States Patent [19]

Carmichael et al.

[11] 4,223,663
[45] Sep. 23, 1980

[54] CEILING MOUNTED SOLAR HEAT COLLECTOR

[76] Inventors: Leo G. Carmichael, 51 Herschell St.; Robert F. Carmichael, 14 Glenwood Cir., both of Lynn, Mass. 01902

[21] Appl. No.: 950,829

[22] Filed: Oct. 12, 1978

[51] Int. Cl.³ .............................................. F24J 3/02
[52] U.S. Cl. .................................. 126/426; 126/400; 126/430; 126/439; 165/46; 350/263
[58] Field of Search ............... 126/270, 271, 400, 426, 126/428, 430, 438, 450, 451; 237/1 A; 350/258, 259, 260, 261, 262, 263, 264, 265; 165/46

[56] References Cited

U.S. PATENT DOCUMENTS

| | | | |
|---|---|---|---|
| 2,572,957 | 10/1951 | Shaw | 350/263 |
| 2,595,905 | 5/1952 | Telkes | 126/270 |
| 2,625,930 | 1/1953 | Harris | 126/270 |
| 3,563,305 | 2/1971 | Hay | 126/270 X |

Primary Examiner—Carroll B. Dority, Jr.
Assistant Examiner—Lee E. Barrett
Attorney, Agent, or Firm—Bacon & Thomas

[57] ABSTRACT

A portion of a suspended ceiling in a room is in the form of an open grid of reflective louvers, those facing a window being curved. A flexible bag containing a mixture including Glaubers salt is supported by the grid and suitable reflecting devices are associated with the window to reflect solar heat to and through the grid where it is absorbed by the mixture in the bag.

5 Claims, 4 Drawing Figures

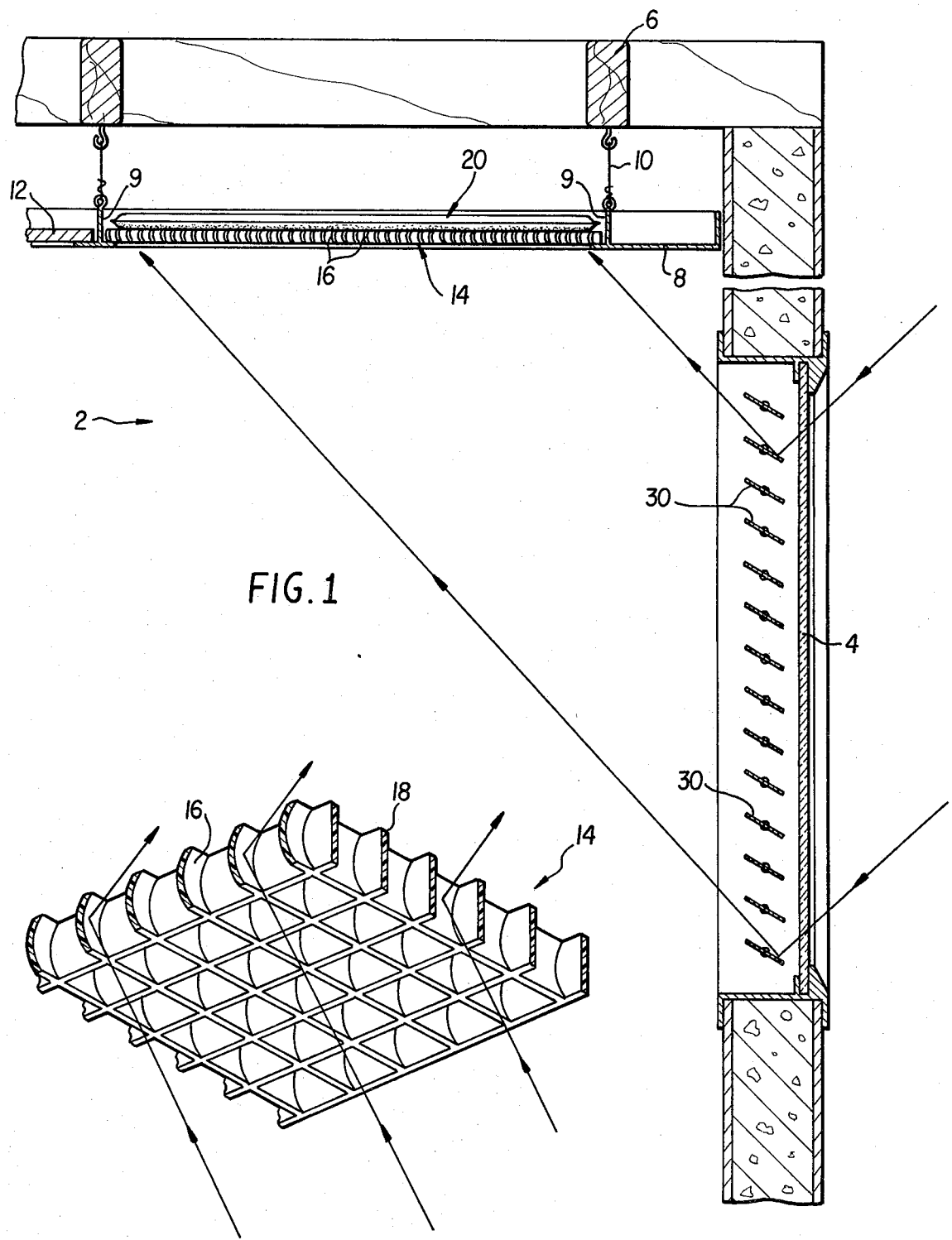

CEILING MOUNTED SOLAR HEAT COLLECTOR

TECHNICAL FIELD OF THE INVENTION

This invention is in the field of solar energy absorbing and storing systems, particularly a system mounted in the ceiling of a room.

BACKGROUND OF THE PRIOR ART

Solar energy directing and storing systems have been proposed heretofore, including means for reflecting sunlight to a heat absorbing medium and absorbing and storing or redistributing heat from that medium. Such proposals have included installation of the systems within a building structure and included essentially the reflection of sunlight through a window or the like onto an absorbing means. For example, see U.S. Pat. Nos. 3,841,302, 3,971,359, 4,026,269 and 4,043,316.

SUMMARY OF THE INVENTION

The present invention differs from the prior art in that it involves the placement of a reflective grid in a suspended ceiling and supporting a bag of heat absorbing material on the grid. Thus, solar energy may be directed from a window and reflected upwardly to and through the ceiling grid where it is absorbed by the absorbent material and released when the ambient temperature in the room is low.

It is an object of the invention to provide a simple and economical solar energy absorbing and storing apparatus readily replaceable and which may be assembled in modular units to whatever size desired, all by duplicating similar elements in side-by-side relation.

The invention further contemplates a particular mixture of heat absorbing solids and water applicant has found to be highly efficient in absorbing and storing solar energy.

Another object is to provide simple and economical means for efficiently directing the maximum amount of solar energy onto the absorbing device.

BRIEF DESCRIPTION OF DRAWINGS

FIG. 1 is a partial and schematic sectional view through a portion of a room in which the present invention is installed;

FIG. 2 is a fragmentary perspective view of a portion of a grid employed in the present invention;

DETAILED DESCRIPTION OF INVENTION

Figure 3:
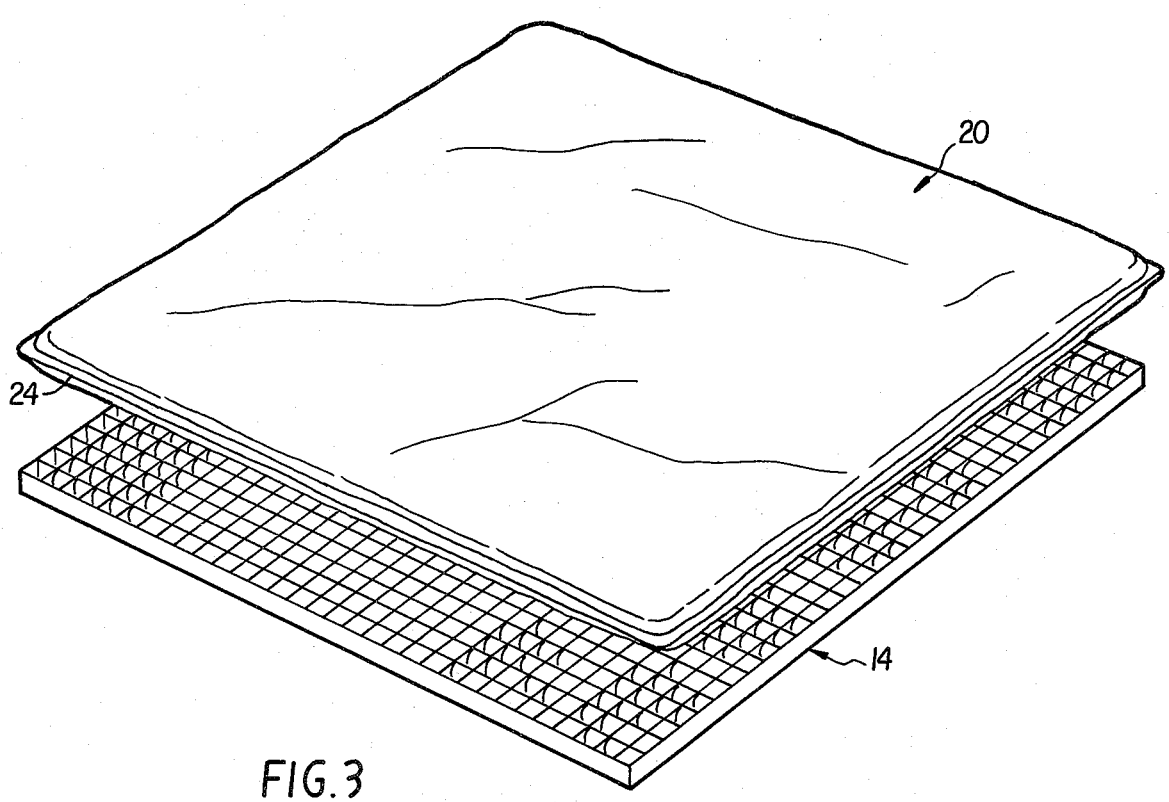
FIG. 3 is a perspective view of a complete grid with a heat absorbing bag thereover.

In FIG. 1, numeral 2 designates generally an enclosure such as a room in a home or other building and have a window 4 therein, a ceiling framework 6 and a suspended ceiling 8. The suspended ceiling 8 is shown as having supports 9 suspended from the framework 6 by filaments 10 although other conventional types of suspended ceilings may be employed. In any event, the suspended ceiling structure will include removable panels of predetermined size and shape, such as the panel shown in fragment at 12. In at least one of the positions in the suspended ceiling, the usual panel is omitted and in its place the elements 9 support a grid 14 of reflective louvers constructed as illustrated in more detail in FIG. 2. The grid may be an integral molded structure or may be fabricated of reflective metal parts but, in any event, all of the surfaces of the grid cells are to be made as highly reflective as possible.

As shown in FIG. 2, the grid is composed of transverse louvers 16 curved transverse to their length, the set of louvers 16 extending completely across the grid in parallel relation and positioned so that the concave reflective sufaces generally face the direction of a source of energy, such as the window 4.

Extending transverse to the curved louvers 18 is a set of planar louvers 18, also of highly reflective surface characteristics.

Supported on the grid 14 when the latter is in position on the suspended ceiling, is a flexible bag 20 containing heat absorbing material. Preferably, the bag 20 is of substantially the same size and shape as the grid 14 so as to overlie the grid in its entirety. The relative dimensions of the bag and grid, as shown in the drawings, and particularly the thickness of the bag, are not limiting but may be varied widely as desired.

Figure 4:
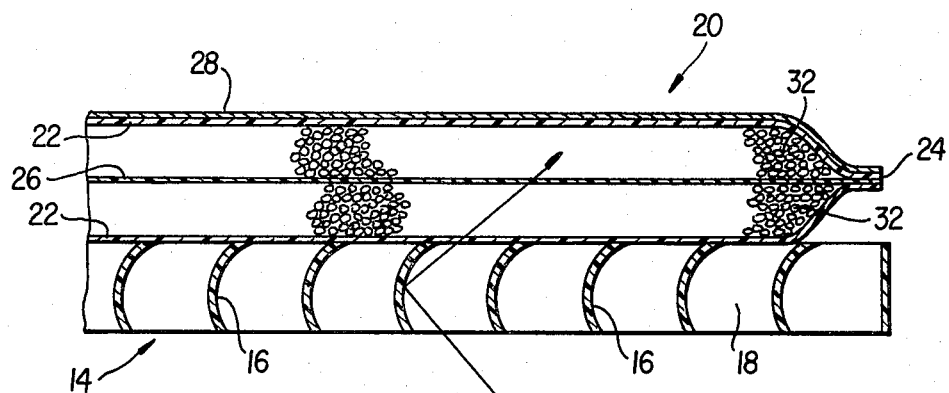
FIG. 4 is an enlarged sectional view showing the supporting grid and heat absorbing bag in greater detail.

Referring more particularly to FIG. 4, the bag 20 comprises outer flexible waterproof sheets 22 sealed around their periphery, as at 24, to define a hermetically sealed enclosure. In addition, a waterproof membrane or partition 26 is provided in the bag 20, which partition is likewise sealed between the edges of the sheets 22 and divides the interior of the bags 20 into upper and lower compartments. The lower surface of the bag 20 and particularly the lower sheet 22 will rest directly on the upper edge of the louvers of grid 14 while the upper sheet 22 will be covered by a sheet of thermal insulating material 28 so that heat absorbed through the louver will not be lose by radiation from the top surface of the bag. While any suitable heat absorbing material may be sealed in the bag 20, applicant prefers a modified Glaubers salt mixture. A preferred material may comprise 56 parts of water, 44 parts of Glaubers salt, 3 parts of borax, 9 parts of sodium chloride, 4 parts of a suitable thickener and 1 part of a surfactant. It has been found that the above mixture is highly efficient in absorbing and retaining a great amount of solar energy and efficiently releases the same to the surroundings when the ambient temperature is reduced.

As shown in FIG. 1, the window 4 is preferably equipped with adjustable shades or louvers 30 that may be angularly adjusted to reflect ambient sunlight from outside the enclosure onto the grid 14 and bag 20 already described. Applicant is aware that adjustable reflective louvers in a window for directing solar energy are old and well known and makes no claim to that feature per se. However, it will be obvious that any suitable reflecting or directing system may be employed to direct the solar energy entering the window onto the ceiling unit. It will also be obvious that the number and position of grids 14 and bags 20 may be varied to suit the particular conditions in a particular room or enclosure by merely predetermining the number of modules to be employed.

The mixture of heat absorbing material already described is designated in FIG. 4 by numeral 32 and may be of semi-solid consistency to render it readily conformable to the supporting surface. The material fills both the upper and lower compartments of the bag, previously described, in approximately equal quantities, the partition serving to prevent undue distortion of the bag or undue cooling of the contained material in a localized region and tends to maintain the water content equal in both compartments.

While a single specific embodiment of the invention has been shown and described herein, the same is merely illustrative of the principles involved and other modifications may be resorted to within the scope of the appended claims.

What is claimed is:

1. A solar heat collecting and storing system comprising:

an enclosure having a ceiling, a portion of said ceiling being a removable grid of reflective louvers;

a waterproof bag of flexible material overlying and being supported by said grid and containing a heat absorbing and storing material including water and Glauber's salt; and means for admitting sunlight into said enclosure and directing the same to said grid to be reflected thereby to said bag.

2. A system as defined in claim 1 wherein said ceiling is a suspended ceiling, said grid and bag being removable therefrom.

3. A system as defined in claim 1 wherein the side of said bag opposite said grid is provided with a layer of heat insulating material.

4. A system as defined in claim 1 wherein said grid includes reflective louvers extending thereacross and being curved transverse to their length and oriented to reflect sunlight from said last-named means onto said bag.

5. A system as defined in claim 1 wherein said last-named means comprises a window and louvers in said window arranged to reflect ambient sunlight from the exterior of said enclosure to said grid.

* * * * *